US011092069B2

(12) United States Patent
Nelson et al.

(10) Patent No.: US 11,092,069 B2
(45) Date of Patent: Aug. 17, 2021

(54) RANKINE CYCLE WASTE HEAT RECOVERY SYSTEM AND METHOD WITH IMPROVED EGR TEMPERATURE CONTROL

(71) Applicant: CUMMINS INC., Columbus, IN (US)

(72) Inventors: Christopher R. Nelson, Columbus, IN (US); Timothy C. Ernst, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/865,768

(22) Filed: May 4, 2020

(65) Prior Publication Data

US 2020/0263601 A1 Aug. 20, 2020

Related U.S. Application Data

(63) Continuation of application No. 14/568,728, filed on Dec. 12, 2014, now abandoned, which is a
(Continued)

(51) Int. Cl.
*F02M 26/33* (2016.01)
*F02B 47/08* (2006.01)
(Continued)

(52) U.S. Cl.
CPC ............... *F02B 47/08* (2013.01); *F02G 5/00* (2013.01); *F02G 5/02* (2013.01); *F02M 26/24* (2016.02);
(Continued)

(58) Field of Classification Search
CPC ........ F02B 47/08; F02B 29/0443; F02G 5/02; F02G 5/00; F02M 26/33; F02M 26/24; Y02T 10/12
(Continued)

(56) References Cited

U.S. PATENT DOCUMENTS 3,232,052 A 2/1966 Ricard
3,621,825 A * 11/1971 Ojala ..................... F02M 26/28
123/568.12
(Continued)

FOREIGN PATENT DOCUMENTS

EP 1 273 785 1/2003
EP 2 002 099 12/2008
(Continued)

OTHER PUBLICATIONS

Barach, John. Dictionary of Automotive Terms—'Ex.' Accessed Feb. 5, 2014. Available from http://www.motorera.com/dictionary/EX.HTM.
(Continued)

*Primary Examiner* — Mahmoud Gimie
*Assistant Examiner* — Joshua Campbell
(74) *Attorney, Agent, or Firm* — Foley & Lardner LLP

(57) ABSTRACT

A waste heat recovery (WHR) system and method for regulating exhaust gas recirculation (EGR) cooling is described. More particularly, a Rankine cycle WHR system and method is described, including an arrangement to improve the precision of EGR cooling for engine efficiency improvement and thermal management.

18 Claims, 2 Drawing Sheets

Related U.S. Application Data continuation of application No. 13/355,339, filed on Jan. 20, 2012, now Pat. No. 8,919,328.

(60) Provisional application No. 61/434,532, filed on Jan. 20, 2011.

(51) Int. Cl.
| | |
|---|---|
| *F02G 5/02* | (2006.01) |
| *F02M 26/24* | (2016.01) |
| *F02G 5/00* | (2006.01) |
| *F02B 29/04* | (2006.01) |

(52) U.S. Cl.
CPC ......... *F02M 26/33* (2016.02); *F02B 29/0443* (2013.01); *Y02T 10/12* (2013.01)

(58) Field of Classification Search
USPC .................................................. 123/568.12
See application file for complete search history.

(56) References Cited

U.S. PATENT DOCUMENTS

| | | | |
|---|---|---|---|
| 3,789,804 A | | 2/1974 | Aguet |
| 4,009,587 A | | 3/1977 | Robinson et al. |
| 4,147,141 A | * | 4/1979 | Nagano ................. F02M 26/39 123/568.12 |
| 4,164,850 A | | 8/1979 | Lowi, Jr. |
| 4,204,401 A | | 5/1980 | Earnest |
| 4,232,522 A | | 11/1980 | Steiger |
| 4,267,692 A | | 5/1981 | Earnest |
| 4,271,664 A | | 6/1981 | Earnest |
| 4,428,190 A | | 1/1984 | Bronicki |
| 4,458,493 A | | 7/1984 | Amir et al. |
| 4,581,897 A | | 4/1986 | Sankrithi |
| 4,630,572 A | | 12/1986 | Evans |
| 4,831,817 A | | 5/1989 | Linhardt |
| 4,873,829 A | | 10/1989 | Williamson |
| 4,911,110 A | | 3/1990 | Isoda et al. |
| 5,121,607 A | | 6/1992 | George, Jr. |
| 5,207,188 A | | 5/1993 | Hama et al. |
| 5,421,157 A | | 6/1995 | Rosenblatt |
| 5,546,915 A | * | 8/1996 | Isobe ..................... F02M 26/33 123/568.12 |
| 5,570,579 A | | 11/1996 | Larjola |
| 5,609,029 A | | 3/1997 | Ahnger et al. |
| 5,649,513 A | | 7/1997 | Kanda |
| 5,685,152 A | | 11/1997 | Sterling |
| 5,771,868 A | | 6/1998 | Khair |
| 5,806,322 A | | 9/1998 | Cakmakci et al. |
| 5,915,472 A | | 6/1999 | Takikawa et al. |
| 5,950,425 A | | 9/1999 | Takahashi et al. |
| 6,014,856 A | | 1/2000 | Bronicki et al. |
| 6,035,643 A | | 3/2000 | Rosenblatt |
| 6,055,959 A | | 5/2000 | Taue |
| 6,138,649 A | | 10/2000 | Khair et al. |
| 6,234,759 B1 | | 5/2001 | Hennel et al. |
| 6,301,890 B1 | | 10/2001 | Zeretzke |
| 6,321,697 B1 | | 11/2001 | Matsuda et al. |
| 6,324,849 B1 | | 12/2001 | Togawa et al. |
| 6,393,840 B1 | | 5/2002 | Hay |
| 6,494,045 B2 | | 12/2002 | Rollins, III |
| 6,523,349 B2 | | 2/2003 | Viteri |
| 6,564,784 B1 | * | 5/2003 | Onodera ................. F02B 37/18 123/568.12 |
| 6,571,548 B1 | | 6/2003 | Bronicki et al. |
| 6,598,397 B2 | | 7/2003 | Hanna et al. |
| 6,606,848 B1 | | 8/2003 | Rollins, III |
| 6,637,207 B2 | | 10/2003 | Konezciny et al. |
| 6,701,712 B2 | | 3/2004 | Bronicki et al. |
| 6,715,296 B2 | | 4/2004 | Bakran et al. |
| 6,745,574 B1 | | 6/2004 | Dettmer |
| 6,748,934 B2 | | 6/2004 | Natkin et al. |
| 6,751,959 B1 | | 6/2004 | McClanahan et al. |
| 6,792,756 B2 | | 9/2004 | Bakran et al. |
| 6,810,668 B2 | | 11/2004 | Nagatani et al. |
| 6,817,185 B2 | | 11/2004 | Coney et al. |
| 6,848,259 B2 | | 2/2005 | Kelller-Sornig et al. |
| 6,877,323 B2 | | 4/2005 | Dewis |
| 6,880,344 B2 | | 4/2005 | Radcliff et al. |
| 6,910,333 B2 | | 6/2005 | Minemi et al. |
| 6,964,168 B1 | | 11/2005 | Pierson et al. |
| 6,977,983 B2 | | 12/2005 | Correia et al. |
| 6,986,251 B2 | | 1/2006 | Radcliff et al. |
| 7,007,487 B2 | | 3/2006 | Belokon et al. |
| 7,028,463 B2 | | 4/2006 | Hammond et al. |
| 7,044,210 B2 | | 5/2006 | Usui |
| 7,069,884 B2 | | 7/2006 | Baba et al. |
| 7,117,827 B1 | | 10/2006 | Hinderks |
| 7,121,906 B2 | | 10/2006 | Sundel |
| 7,131,259 B2 | | 11/2006 | Rollins, III |
| 7,131,290 B2 | | 11/2006 | Taniguchi et al. |
| 7,159,400 B2 | | 1/2007 | Tsutsui et al. |
| 7,174,716 B2 | | 2/2007 | Brasz et al. |
| 7,174,732 B2 | | 2/2007 | Taniguchi et al. |
| 7,191,740 B2 | | 3/2007 | Baba et al. |
| 7,200,996 B2 | | 4/2007 | Cogswell et al. |
| 7,225,621 B2 | | 6/2007 | Zimron et al. |
| 7,281,530 B2 | | 10/2007 | Usui |
| 7,325,401 B1 | | 2/2008 | Kesseli et al. |
| 7,340,897 B2 | | 3/2008 | Zimron et al. |
| 7,454,911 B2 | | 11/2008 | Tafas |
| 7,454,912 B2 | | 11/2008 | Yamanaka et al. |
| 7,469,540 B1 | | 12/2008 | Knapton et al. |
| 7,578,139 B2 | | 8/2009 | Nishikawa et al. |
| 7,665,304 B2 | | 2/2010 | Sundel |
| 7,721,552 B2 | | 5/2010 | Hansson et al. |
| 7,797,940 B2 | | 9/2010 | Kaplan |
| 7,823,381 B2 | | 11/2010 | Misselhorn |
| 7,833,433 B2 | | 11/2010 | Singh et al. |
| 7,866,157 B2 | | 1/2011 | Ernst et al. |
| 7,942,001 B2 | | 5/2011 | Radcliff et al. |
| 7,958,873 B2 | | 6/2011 | Ernst et al. |
| 7,997,076 B2 | | 8/2011 | Ernst |
| 8,528,333 B2 | * | 9/2013 | Juchymenko ........... F01K 23/02 60/618 |
| 2002/0099476 A1 | | 7/2002 | Hamrin et al. |
| 2003/0033812 A1 | | 2/2003 | Gerdes et al. |
| 2003/0106316 A1 | * | 6/2003 | Endoh ....................... F01N 5/02 60/651 |
| 2003/0213245 A1 | | 11/2003 | Yates et al. |
| 2003/0213246 A1 | | 11/2003 | Coll et al. |
| 2003/0213248 A1 | | 11/2003 | Osborne et al. |
| 2005/0016193 A1 | | 1/2005 | Tarasinski et al. |
| 2005/0262842 A1 | | 12/2005 | Claassen et al. |
| 2007/0131180 A1 | * | 6/2007 | Roehm ............... F02M 25/0227 123/25 A |
| 2007/0204623 A1 | | 9/2007 | Rollins, III |
| 2008/0141757 A1 | | 6/2008 | Atkinson et al. |
| 2008/0289313 A1 | * | 11/2008 | Batscha ................. F01K 23/04 60/39.5 |
| 2009/0031724 A1 | | 2/2009 | Ruiz |
| 2009/0048765 A1 | | 2/2009 | Kang et al. |
| 2009/0090109 A1 | | 4/2009 | Mills et al. |
| 2009/0121495 A1 | | 5/2009 | Mills |
| 2009/0133646 A1 | | 5/2009 | Wankhede et al. |
| 2009/0151356 A1 | | 6/2009 | Ast et al. |
| 2009/0179429 A1 | | 7/2009 | Ellis et al. |
| 2009/0211253 A1 | | 8/2009 | Radcliff et al. |
| 2009/0320477 A1 | | 12/2009 | Juchymenko |
| 2009/0322089 A1 | | 12/2009 | Mills et al. |
| 2010/0018207 A1 | | 1/2010 | Juchymenko |
| 2010/0024379 A1 | * | 2/2010 | Sengar ............... B01D 53/8631 60/39.5 |
| 2010/0071368 A1 | | 3/2010 | Kaplan et al. |
| 2010/0083919 A1 | | 4/2010 | Bucknell |
| 2010/0139626 A1 | | 6/2010 | Raab et al. |
| 2010/0180584 A1 | | 7/2010 | Berger et al. |
| 2010/0192569 A1 | | 8/2010 | Ambros et al. |
| 2010/0229525 A1 | | 9/2010 | Mackay et al. |
| 2010/0257858 A1 | | 10/2010 | Yaguchi et al. |
| 2010/0263380 A1 | | 10/2010 | Biederman et al. |
| 2010/0282221 A1 | | 11/2010 | Le Lievre |
| 2010/0288571 A1 | | 11/2010 | Dewis et al. |

(56) References Cited

U.S. PATENT DOCUMENTS

| | | | |
|---|---|---|---|
| 2011/0006523 A1 | 1/2011 | Samuel | |
| 2011/0094485 A1 | 4/2011 | Vuk et al. | |
| 2011/0209473 A1 | 9/2011 | Fritz et al. | |
| 2012/0023946 A1 | 2/2012 | Ernst et al. | |
| 2014/0076292 A1* | 3/2014 | Gaiser | F01N 3/043 123/568.12 |

FOREIGN PATENT DOCUMENTS

| | | | |
|---|---|---|---|
| GB | 1601832 A * | 11/1981 | F02B 29/0412 |
| JP | 60-222511 | 11/1985 | |
| JP | 63-255507 | 10/1988 | |
| JP | 08-068318 | 3/1996 | |
| JP | 09-032653 | 2/1997 | |
| JP | 10-238418 | 9/1998 | |
| JP | 11-166453 | 6/1999 | |
| JP | 2005-036787 | 2/2005 | |
| JP | 2005-042618 | 2/2005 | |
| JP | 2005-201067 | 7/2005 | |
| JP | 2005-329843 | 12/2005 | |
| JP | 2007-239513 | 9/2007 | |
| JP | 2008-240613 | 10/2008 | |
| JP | 2009-167995 | 7/2009 | |
| JP | 2009-191647 | 8/2009 | |
| JP | 2009-287433 | 12/2009 | |
| JP | 2010-077964 | 4/2010 | |
| WO | WO-2004/081482 | 9/2004 | |
| WO | WO-2009/064242 | 5/2009 | |
| WO | WO-2009/098471 | 8/2009 | |
| WO | WO-2010/070786 | 6/2010 | |

OTHER PUBLICATIONS

Final Office Action from U.S. Appl. No. 14/568,728, dated Feb. 13, 2020.
Final Office Action from U.S. Appl. No. 14/568,728, dated Nov. 1, 2018.
Non-Final Office Action from U.S. Appl. No. 14/568,728, dated Sep. 5, 2019.
Search Report from corresponding EP Application No. 17160972, dated Oct. 20, 2017, pp. 1-6.
The Extended European Search Report issued in European Patent Application No. 12736180.6, dated Sep. 9, 2015.

* cited by examiner

RANKINE CYCLE WASTE HEAT RECOVERY SYSTEM AND METHOD WITH IMPROVED EGR TEMPERATURE CONTROL

CROSS-REFERENCE TO RELATED APPLICATIONS

The present application is a continuation of U.S. patent application Ser. No. 14/568,728, filed Dec. 12, 2014, which is a continuation of U.S. patent application Ser. No. 13/355,339, filed on Jan. 20, 2012, now U.S. Pat. No. 8,919,328, which claims the benefit of priority to U.S. Provisional Patent Application No. 61/434,532, filed on Jan. 20, 2011, the content of each is hereby incorporated by reference in its entirety.

STATEMENT REGARDING FEDERALLY SPONSORED RESEARCH OR DEVELOPMENT

This invention was made with government support under contract number DE-FC26-05NT42419 awarded by the Department of Energy (DOE). The government has certain rights in this invention.

TECHNICAL FIELD

This disclosure relates to a waste heat recovery (WHR) system and method for regulating exhaust gas recirculation (EGR) cooling and thus temperature control, and more particularly, to a Rankine cycle WHR system and method, including an arrangement to improve the precision of EGR cooling for engine efficiency improvement and thermal management.

BACKGROUND

Increasing the efficiency of internal combustion engines is critical to meet customer expectations and an array of government-mandated regulations. Internal combustion engines generate significant amounts of heat that heat exchangers eventually transfer to the air surrounding the internal combustion engine. Waste heat recovery systems use some of this significant source of heat to improve the efficiency of an internal combustion engine. Waste heat recovery systems may offer additional benefit to an engine beyond converting waste heat to energy or work.

SUMMARY

This disclosure provides an internal combustion engine comprising an exhaust gas recirculation (EGR) system containing an EGR gas and a waste heat recovery (WHR) system adapted to provide cooling to the EGR gas. The WHR system includes a WHR circuit, a fluid containment portion, a feed pump, at least one heat exchanger, an energy conversion portion, and an EGR temperature control circuit connected to the WHR circuit. The feed pump is operable to pump a working fluid from the containment portion through the WHR circuit. The at least one heat exchanger is positioned downstream from the feed pump and is operable to convert the working fluid from a liquid to a high-pressure vapor by transferring heat from the EGR gas to the working fluid. The energy conversion portion is positioned between the heat exchanger and the containment portion. A thermal control unit is positioned along the EGR temperature control circuit to cool the EGR gas and a pressure reduction device is positioned along the EGR temperature control circuit upstream of the thermal control unit to reduce the pressure of the working fluid sufficient to create a phase change of the working fluid.

This disclosure also provides an internal combustion engine comprising an EGR system containing an EGR gas and a WHR system. The EGR system includes at least one heat exchanger and a thermal control unit positioned downstream from the at least one heat exchanger. The WHR system is adapted to provide a working fluid from a containment portion into a WHR circuit and a parallel EGR temperature control circuit. The WHR circuit includes a feed pump, the at least one heat exchanger, and an energy conversion portion. The at least one heat exchanger is adapted to provide cooling to the EGR gas and to change the phase of the working fluid from a liquid to a high-pressure vapor. The EGR temperature control circuit includes the thermal control unit and the thermal control unit is positioned along the EGR temperature control circuit to cool the EGR gas.

This disclosure also provides an internal combustion engine comprising an EGR system containing an EGR gas, a WHR system, at least one sensor and a control system. The EGR system includes at least one heat exchanger and a thermal control unit positioned downstream from the at least one heat exchanger. The WHR system is adapted to provide cooling to the EGR gas. The WHR system includes a WHR circuit, a fluid containment portion, a feed pump, the at least one heat exchanger, an energy conversion portion, a thermal control unit, and a compressor. The feed pump is operable to pump a working fluid from the containment portion through the WHR circuit. The at least one heat exchanger is positioned downstream from the feed pump and is operable to convert the working fluid from a liquid to a high-pressure vapor by transferring heat from the EGR gas to the working fluid. The energy conversion portion is positioned between the at least one heat exchanger and the containment portion. The thermal control unit is connected to the WHR circuit and is positioned along the EGR temperature control circuit to cool the EGR gas. The compressor is positioned along the EGR temperature control circuit to pump working fluid from the thermal control unit. The at least one sensor is positioned along at least one of the EGR system and the WHR circuit. The at least one sensor is adapted to generate an output signal. The control system is adapted to receive the output signal and to generate a control signal based on the output signal to control the speed of at least one of the feed pump and the compressor.

Advantages and features of the embodiments of this disclosure will become more apparent from the following detailed description of exemplary embodiments when viewed in conjunction with the accompanying drawings.

DETAILED DESCRIPTION

Figure 1:
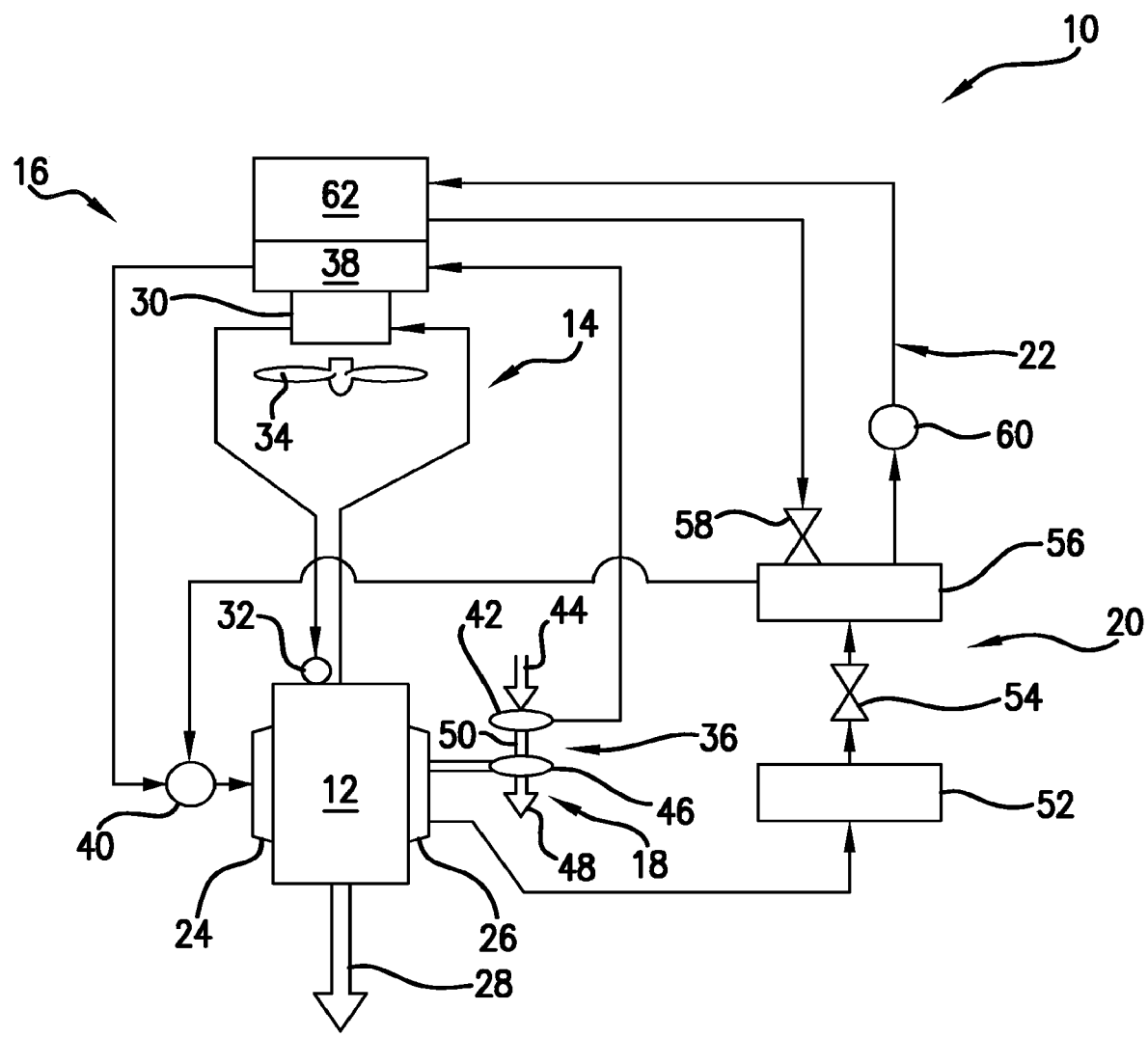
FIG. 1 is a schematic of a conventional internal combustion engine incorporating an exhaust gas recirculation (EGR) system.

Referring to FIG. 1, shown therein is a conventional internal combustion engine 10. Engine 10 may include an engine body or block 12, an engine cooling circuit 14, an air intake system 16, an exhaust system 18, an EGR system 20, and a refrigeration circuit 22.

Engine body or block 12 may include an intake manifold 24 and an exhaust manifold 26. Engine body 12 provides an engine output 28, which may be a shaft or other mechanism (not shown) that drives a vehicle, generator, or other device that is able to make use of the output of engine body 12.

Engine cooling circuit 14 may include a radiator 30 and a fluid pump 32. Engine cooling circuit 14 extends from engine block 12 to radiator 30 and back to engine block 12. Cooling fluid pump 32 is adapted to circulate a cooling fluid and may be positioned along cooling circuit 14 between radiator 30 and engine body 12 in a location that is downstream from radiator 30. A fan 34 may be positioned adjacent to radiator 30 to provide air for heat removal from radiator 30. A mechanical output of engine block 12 may drive cooling fluid pump 32, which moves cooling fluid through engine cooling circuit 14. Cooling fluid pump 32 pushes cooling fluid downstream into engine block 12. The cooling fluid then flows from engine block 12 to radiator 30, where a cooling mechanism, such as fan 34, reduces the temperature of the cooling fluid. The cooling fluid then flows downstream to pump 32 to complete the circuit.

Air intake system 16 extends from an air source 44 to intake manifold 24 and may include a turbocharger 36, a charge air cooler 38, and an EGR mixer 40. Turbocharger 36 includes a compressor 42. Charge air cooler 38 is positioned along air intake system 16 downstream from compressor 42. Between charge air cooler 38 and intake manifold 24 is EGR mixer 40. The rotation of compressor 42, caused by the action of exhaust system 18, described in more detail hereinbelow, compresses air from air source 44. The action of compressor 42 heats the air, which may require cooling before entering intake manifold 24. Charge air cooler 38 receives the compressed air and cools it before the compressed air flows downstream to EGR mixer 40. From EGR mixer 40, the compressed air enters intake manifold 24.

Exhaust system 18 may include a turbocharger turbine 46 and an exhaust outlet 48. High-pressure exhaust gas from exhaust manifold 26 flows downstream to enter turbine 46, causing turbine 46 to rotate. The exhaust gas, at reduced pressure after passing through turbine 46, flows to exhaust outlet 48. Exhaust outlet 48 may connect to various conventional elements and systems, such as aftertreatment devices and an exhaust pipe or exhaust stack (not shown). Turbine 46 connects to compressor 42 by way of a connection 50. Thus, the rotation of turbine 46 causes compressor 42 to rotate.

EGR system 20 extends from exhaust manifold 26 to air intake system 16 and may include an EGR cooler 52, an EGR valve 54, an evaporator 56, and EGR mixer 40, previously described. EGR cooler 52 is positioned along EGR system 20 downstream from exhaust manifold 26. Evaporator 56 is positioned along EGR system 20 downstream from EGR cooler 52 and upstream from EGR mixer 40. EGR valve 54 may be positioned between EGR cooler 52 and evaporator 56. High-pressure exhaust gas flows from exhaust manifold 26 to EGR cooler 52, which decreases the temperature of the EGR gas. From EGR cooler 52, the exhaust gas flows downstream to evaporator 56, which is also part of refrigeration circuit 22, as will be described further hereinbelow. Evaporator 56 provides additional cooling to the EGR gas flowing through EGR system 20. The EGR gas then flows downstream to EGR mixer 40, where the EGR gas mixes with air from intake system 16 prior to entry of the air and EGR gas mixture into intake manifold 24.

Refrigeration circuit 22 includes a thermal expansion valve (TXV) 58, evaporator 56, a compressor 60, and a condenser 62. Refrigeration circuit 22 connects evaporator 56 to condenser 62. Positioned along refrigeration circuit 22 is compressor 60, which is between evaporator 56 and condenser 62 and downstream from evaporator 56. Downstream from condenser 62 and upstream from evaporator 56 is valve 58. Compressor 60 serves to pump a refrigerant through refrigeration circuit 22. As refrigerant flows into evaporator 56, the heat from the EGR gas flowing through evaporator 56, described hereinabove, causes the refrigerant to vaporize. The action of compressor 60 causes the vaporized refrigerant to flow downstream to condenser 62, where fan 34 or other cooling mechanisms cool the refrigerant, causing it to condense to form a liquid. The refrigerant then flows back to evaporator 56, regulated by the action of valve 58, thus completing the refrigeration circuit. Compressor 60 may also be regulated to control the rate of refrigerant flow through circuit 22. The benefit of the ability to adjust the temperature of the EGR gas is that increased cooling of EGR gas may lead to lower emissions of NOx from engine 10.

While the conventional system of FIG. 1 works to cool EGR gas, it does so either by adding a dedicated refrigeration circuit 22 to the engine or by using an existing refrigerant system, such as a vehicle's air conditioning refrigerant system. In either case, refrigeration circuit 22 causes a reduction in the efficiency of internal combustion engine 10.

Figure 2:
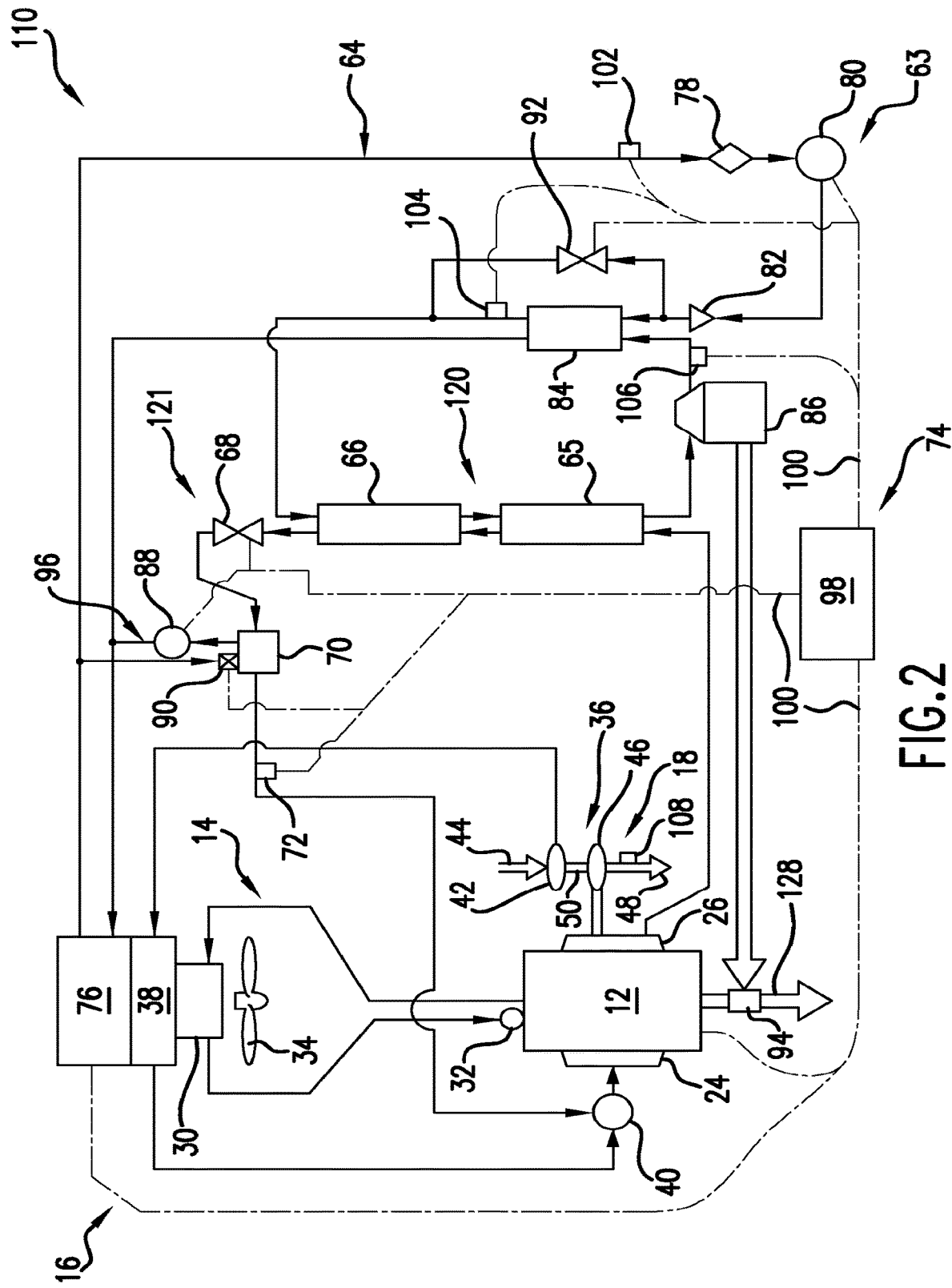
FIG. 2 is a schematic of an exemplary embodiment of the present disclosure.

Referring now to FIG. 2, an exemplary embodiment of the present disclosure is described. Elements in the exemplary embodiment having the same number as the convention embodiment described in FIG. 1 work as described hereinabove are discussed again only as necessary for clarity.

The exemplary embodiment is shown in conjunction with an internal combustion engine 110. Internal combustion engine 110 may include engine body or block 12, engine cooling circuit 14, air intake system 16, exhaust system 18, an EGR system 120, a waste heat recovery system (WHR) 63, and a control system 74. Engine body 12, engine cooling circuit 14, air intake system 16, and exhaust system 18 are described hereinabove.

EGR system 120 includes an EGR circuit 121 extending from exhaust manifold 26 to connect to air intake system 16. EGR system 120 may include a superheater 65, a boiler 66, an EGR valve 68, an EGR thermal control unit (TCU) 70, and EGR mixer 40. EGR system 120 terminates at EGR mixer 40, where EGR system 120 interfaces with air intake system 16. Superheater 65 and boiler 66 may be positioned along EGR system 120 between exhaust manifold 26 and EGR mixer 40 to cool the EGR gas as described hereinbelow. While superheater 65 and boiler 66 are shown as two separate heat exchanger units, they may be a single integrated unit with two sections. In another embodiment, only one single heat exchanger may be used. EGR valve 68 and TCU 70 may be positioned along EGR system 120 between boiler 66 and EGR mixer 40 to further selectively and variably cool the EGR gas thereby controlling EGR temperature as described hereinbelow. A temperature sensor 72 may be located along EGR system 120 between TCU 70 and EGR mixer 40.

WHR system 63 may include a WHR circuit 64, a working fluid cooling and containment portion (FCCP) 76, a filter and dryer 78, a feed pump 80, a check valve 82, a recuperator 84, boiler 66, superheater 65, and an energy conversion portion 86. FCCP 76 may include a condenser, a reservoir and a sub-cooler. The functions of these devices may be performed by a single unit or by a combination of separate units.

Positioned along a first fluid path of WHR circuit 64 downstream of FCCP 76 is feed pump 80. Filter and dryer 78 may be positioned along WHR circuit 64 between FCCP 76 and feed pump 80. Positioned along WHR circuit 64 downstream from feed pump 80 are recuperator 84, boiler 66, and superheater 65. Because of the function of recuperator 84, described in more detail hereinbelow, recuperator 84 is located in two places along WHR circuit 64. The first location is between feed pump 80 and boiler 66. The second location is between superheater 65 and FCCP 76. Energy conversion portion 86 is located along WHR circuit 64 downstream from superheater 65 and upstream from recuperator 84. Check valve 82 may be located between feed pump 80 and recuperator 84. A recuperator bypass 92 may provide a path around recuperator 84 that connects feed pump 80 with boiler 66. The structure and function of the recuperator and the recuperator bypass is discussed in detail in U.S. Pat. No. 7,997,076 issued Aug. 16, 2011, the entire contents of which are hereby incorporated by reference. The connection of recuperator 84 to FCCP 76 completes WHR circuit 64.

Energy conversion portion 86 is capable of producing additional work or transferring energy to another device or system. For example, energy conversion portion 86 may be a turbine, piston, scroll, screw, or other type of expander device that moves, e.g., rotates, as a result of expanding working fluid vapor to provide additional work, which can be fed into the engine's driveline, for example, a driveline or engine output 128 of internal combustion engine 110 by way of a coupling mechanism 94, to supplement the engine's power either mechanically or electrically (e.g., by turning a generator), or it can be used to drive a generator and power electrical devices, parasitics or a storage battery (not shown). Alternatively, energy conversion portion 86 can be used to transfer energy from one system to another system (e.g., to transfer heat energy from WHR system 63 to a fluid for a heating system). One type of energy conversion portion 86 is described in more detail in U.S. patent application Ser. No. 13/347,322, filed Jan. 10, 2012, the entire contents of which is hereby incorporated by reference.

WHR system 63 further includes an EGR temperature control circuit 96 positioned along WHR circuit 64 in parallel with feed pump 80, at least one heat exchanger 65/66, and energy conversion portion 86. Specifically, EGR temperature control circuit 96 is connected to WHR circuit 64 at a position downstream from FCCP 76 to thereby receive working fluid from WHR circuit 64, and further connected to WHR circuit 64 upstream of FCCP 76 to return or deliver working fluid to WHR circuit 64 for delivery to FCCP 76 without flowing through feed pump 80, at least one heat exchanger 65/66, and energy conversion portion 86. The connection of circuit 96 to circuit 64 downstream of FCCP 76 may be upstream of feed pump 80, while the upstream connection of circuit 96 to circuit 64 may be along circuit 64 downstream of recuperator 84. WHR system 63 includes a pressure reduction device 90 and may further include a compressor 88 positioned along circuit 96. Pressure reduction device 90 may be a simple orifice or an expansion valve operable to cause a pressure drop in the fluid flow across the orifice or valve sufficient to cause the working fluid to change phase from a liquid to a gas. Pressure reduction device 90 may be positioned along circuit 96 upstream from TCU 70. Compressor 88 may be positioned along circuit 96 downstream from TCU 70 to pull the gaseous working fluid from TCU 70 and direct it into working fluid circuit 64. Instead of compressor 88, circuit 96 may be connected to circuit 64 downstream of feed pump 80 so that higher pressure working fluid in forced into and through circuit 96 and TCU 70. But, in this case, the evaporation temperature of the working fluid would be limited to that associated with the FCCP pressure. Using the compressor allows for an even lower pressure to be drawn in TCU 70, allowing cooling at temperatures below that attained in the FCCP. Thus, as described hereinbelow, at least a portion of the cool working fluid (liquid phase) flowing from FCCP 76 can be selectively and variably directed through TCU 70 and then returned to FCCP 76 to control the temperature of EGR gas in EGR circuit 121 before it mixes with intake air and returns to the engine body 12.

As shown in FIG. 2, an EGR gas under high pressure flows downstream along EGR system 120 to superheater 65 and then to boiler 66. The EGR gas is cooled as it passes through superheater 65 and boiler 66. However, the primary purpose of superheater 65 and boiler 66, which will be described in more detail hereinbelow, is related to the function of WHR system 63 rather than cooling the EGR gas. Thus, cooling of the EGR gas may be insufficient for optimal efficiency and NOx emission control in internal combustion engine 110. TCU 70, which is downstream along EGR system 120 from EGR valve 68 and from boiler 66, provides cooling of EGR gas flow as its only function. Thus, as will be described in more detail hereinbelow, TCU 70 is able to controllably adjust the temperature of the EGR gas independent of the waste heat recovery function of WHR system 63. The EGR gas, now cooled to an optimal temperature by TCU 70, flows to EGR mixer 40, where it joins airflow in air intake system 16.

WHR system 63, containing a working fluid, is a Rankine cycle waste heat recovery system or an organic Rankine cycle system if the working fluid is an organic high molecular mass fluid with a liquid-vapor phase change that is lower than the water-steam phase change. Examples of Rankine cycle working fluids, organic and inorganic, include Genetron® R-245fa from Honeywell, Therminol®, Dowtherm J™ from Dow Chemical Co., Fluorinol® from American Nickeloid, toluene, dodecane, isododecane, methylundecane, neopentane, neopentane, octane, water/methanol mixtures, or steam. While the system described below may be a Rankine cycle or an organic Rankine cycle, it also presents an opportunity with respect to the EGR system.

FCCP 76 may perform multiple functions including a condenser function, a cooling or sub-cooling function, and a receiver or reservoir function. Feed pump 80 pulls liquid working fluid from FCCP 76 through filter dryer 78, which serves to remove contaminants from the liquid working fluid. Feed pump 80 then moves the liquid working fluid downstream along WHR circuit 64 through a check valve 82 that prevents reverse flow of the liquid working fluid. The liquid working fluid may then pass through recuperator 84 to receive a first heat transfer from vaporized working fluid, which is received from energy conversion portion 86. In cases where the liquid working fluid is warm or the vaporized working fluid requires less cooling, recuperator bypass valve 92 may divert some or all liquid working fluid around recuperator 84. Bypass valve 92 may be a proportional valve that permits a portion of the liquid working fluid to bypass recuperator 84. Alternatively, bypass valve 92 may be modulated to open and close to adjust the amount of liquid working fluid entering recuperator 84.

Downstream from recuperator 84 is boiler 66, which transfers heat from EGR gas to the liquid working fluid, which causes the liquid working fluid to boil or vaporize. The liquid working fluid then flows to superheater 65, which increases the heat content of the vaporized working fluid and evaporates any liquid working fluid that remains. The vaporized working fluid is at high pressure, which flows along WHR circuit 64 to energy conversion portion 86, which has been previously described. As the vaporized working fluid passes through energy conversion portion 86, the temperature and pressure of the vaporized working fluid decreases. The vaporized working fluid flows downstream to recuperator 84, where, as previously described, some of the heat energy transfers to the liquid working fluid flowing into recuperator 84 from feed pump 80. The vaporized working fluid then travels to FCCP 76, where the vaporized working fluid is condensed to a liquid, cooled to the extent necessary to maintain the function of WHR system 63, and stored until the liquid working fluid travels through WHR circuit 64 again.

Temperature control circuit 96 forms a fluid branch that operates in parallel to the above-described path. Liquid working fluid flows into temperature control circuit and then vaporizes. The vapor is then moved downstream to FCCP 76 by the action of compressor 88. Thus, if compressor 88 is off, pressure builds in TCU 70 and working fluid does not flow through temperature control circuit 96. When compressor 88 is on, liquid working fluid flows through valve 90, which may be a thermal expansion valve, into TCU 70. Because the EGR gas flow through TCU 70 has a temperature greater than the phase change temperature of the liquid working fluid, TCU 70 functions to reduce the temperature of the EGR gas while vaporizing the liquid working fluid. Compressor 88 then moves the vaporized working fluid back into the flow path that extends from recuperator 84 to FCCP 76.

Control system 74 may include a control module 98 and a wiring harness 100. Control module 98, which may be a single processor, a distributed processor, an electronic equivalent of a processor, or any combination of the aforementioned elements, as well as software, electronic storage, fixed lookup tables and the like, is connected to certain components of internal combustion engine 110 by wire harness 100, though such connection may be by other means, including a wireless system.

Control module 98 may connect to and send control signals to EGR valve 68, FCCP 76, feed pump 80, valve 90, and bypass valve 92. Control module 98 may also connect to and receive signals from engine body 12, temperature sensor 72, a temperature and pressure sensor 102, a temperature sensor 104, a temperature sensor 106, and a NOx sensor 108. Control module 98 may receive signals from other sensors positioned throughout internal combustion engine 110 that serve to adjust the performance of EGR system 120 and WHR circuit 64. Temperature sensor 102 may be positioned along WHR circuit 64 upstream from feed pump 80. Temperature sensor 104 may be positioned along WHR circuit 64 between recuperator 84 and boiler 66. Temperature sensor 106 may be positioned along WHR circuit 64 downstream from energy conversion portion 86. NOx sensor 108 may be positioned along exhaust system 18.

Control system 74 may serve to control EGR system 120 by first receiving signals from engine body 12, temperature sensor 72, and NOx sensor 108. Engine body 12 may indicate a need to change the temperature of the EGR gas flow into engine body 12 based on, for example, a change in engine operating conditions, such as engine load, or a detected or anticipated change in NOx emissions. Control system 74 may respond by increasing or decreasing EGR flow by adjusting EGR valve 68 to open or close, depending on the signal from engine body 12 and the temperature signal from temperature sensor 72. Control system 74 may also adjust the speed of compressor 88 to increase or decrease the flow of working fluid through TCU 70 to adjust the temperature of the EGR gas flowing through TCU 70. While valve 90 may be a fixed orifice, it may also be adjustable so that as compressor 88 operates, the pressure within TCU 70 may be adjusted, which would thus permit cooling of the EGR gas at different temperature levels since the phase-change temperature of the working fluid varies with pressure. By decreasing the compressor flow rate the pressure in TCU 70 is permitted to build, which increases the phase change temperature and provides less cooling for higher EGR temperature. Conversely, increasing the speed of compressor 88 reduces the pressure in TCU 70 and decreases the phase change temperature, which increases cooling of the EGR gas. Valve 90 may also be adjusted to modify the pressure within TCU 70. For example, increased flow through valve 90 may increase pressure in TCU 70, assuming the speed of compressor 88 remains fixed, which increases the phase change temperature and decreases cooling of the EGR gas. Conversely, reducing flow through valve 90 decreases the pressure, which decreases the phase change temperature and increases cooling of the EGR gas.

Control system 74 may use NOx sensor 108 to control the function of temperature control circuit. More specifically, if NOx sensor 108 indicates a rising level of NOx, control system 74 may respond by increasing the flow of working fluid through TCU 70 by increasing the speed of compressor 88 and/or closing valve 90, thus increasing cooling of the EGR gas.

Control system 74 may control other aspects of WHR circuit 64. For example, a signal received from temperature and pressure sensor 102 may indicate that sub-cooling of the liquid working fluid needs modified to increase the cavitation margin of feed pump 80. Control system 74 may send a control signal to FCCP 76 to adjust sub-cooling, or the speed of feed pump 80 may be adjusted. Temperature sensor 104 may send a signal indicating a need for more heating or less heating of the working fluid as it flows through recuperator 84. Control system 74 may then adjust bypass valve 92 to change the amount of heating provided to the working fluid by recuperator 84. Temperature sensor 106 may indicate a need to adjust the superheat temperature of the working fluid, which may be accomplished by adjusting the flow of EGR gas through the EGR circuit, if the engine condition permits such adjustment, or by adjusting the speed of feed pump 80 and bypass valve 92 to increase or decrease heat transferred to the liquid working fluid prior to the liquid working fluid entering boiler 66.

As will be understood from the foregoing description, TCU 70 provides a significant benefit to the function of internal combustion engine 110. The liquid working fluid routed through temperature control circuit 96 proceeds directly from FCCP 76 to TCU 70 and then back to FCCP 76. Thus, the cooling provided to the EGR gas flow by TCU 70 is independent of the working fluid flow through the portion of the WHR system 63 that passes through energy conversion portion 86, which permits more precise cooling of the EGR gas flow. Thus, TCU 70 permits using WHR system 63 for two separate waste heat recovery system functions while permitting both to operate independent of each other, that being the energy recovered from energy conversion portion 86 and the precise temperature control of the EGR gas flow by TCU 70.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. An internal combustion engine, comprising:
an exhaust gas recirculation (EGR) system containing an EGR gas; and
a waste heat recovery (WHR) system adapted to provide cooling to the EGR gas, the WHR system including:
a WHR circuit comprising:
a fluid cooling and containment portion (FCCP) configured to receive a volume of a working fluid and cool the volume of the working fluid, and
a feed pump configured to receive a first portion of the volume of the working fluid from the FCCP and pump the first portion of the volume of the working fluid;
an EGR temperature control circuit connected to the WHR circuit in parallel with the feed pump and configured to receive a second portion of the volume of the working fluid from the WHR circuit downstream of the FCCP and to return the second portion of the volume of the working fluid to the WHR circuit upstream of the FCCP;
a thermal control unit (TCU) positioned along the EGR temperature control circuit to cool the EGR gas; and
a superheater fluidly coupled to the pump in series with the pump; and
a boiler fluidly coupled to the pump in series with the superheater upstream of the superheater,
wherein:
the superheater and the boiler are included in the each of the WHR circuit and the EGR temperature control circuit such that each of the first portion and the second portion of the volume of the working fluid flow through the superheater and the boiler in heat exchanging relationship with the superheater and the boiler respectively, while being fluidly isolated from each other.

2. The internal combustion engine of claim 1, wherein the TCU is in working fluid receiving communication with the EGR temperature control circuit, the TCU operatively coupled to and in EGR gas receiving communication with the EGR system.

3. The internal combustion engine of claim 2, wherein the TCU is configured to controllably adjust a temperature of the EGR gas independent of a WHR function of the WHR system.

4. The internal combustion engine of claim 1, further comprising an expansion valve positioned along the EGR temperature control circuit upstream of the TCU, the expansion valve operable to cause a pressure drop in the working fluid sufficient to cause the working fluid to change phase from a liquid to a gas.

5. The internal combustion engine of claim 4, wherein the expansion valve is operable to:
selectively decrease the flow rate of the working fluid so as to increase the pressure of the working fluid in the TCU, thereby increasing the phase change temperature of the working fluid to provide less cooling to the EGR gas; and
selectively increase the flow rate of the working fluid so as to decrease the pressure of the working fluid in the TCU, thereby decreasing the phase change temperature of the working fluid to provide more cooling to the EGR gas.

6. The internal combustion engine of claim 1, further comprising a compressor positioned along the EGR temperature control circuit downstream of the TCU, the compressor operable to control a flow rate of the working fluid through the TCU so as to adjust the temperature of the EGR gas flowing through the TCU.

7. The internal combustion engine of claim 6, wherein the compressor is operable to:
selectively decrease the flow rate of the working fluid so as to increase the pressure of the working fluid in the TCU, thereby increasing the phase change temperature of the working fluid to provide less cooling to the EGR gas; and
selectively increase the flow rate of the working fluid so as to decrease the pressure of the working fluid in the TCU, thereby decreasing the phase change temperature of the working fluid to provide more cooling to the EGR gas.

8. An internal combustion engine, comprising:
an exhaust gas recirculation (EGR) system containing an EGR gas; and
a waste heat recovery (WHR) system adapted to provide cooling to the EGR gas, the WHR system including:
a WHR circuit comprising:
a fluid cooling and containment portion (FCCP) configured to receive a volume of a working fluid and cool the volume of the working fluid, and
a feed pump configured to receive a first portion of the volume of the working fluid from the FCCP and pump the first portion of the volume of the working fluid;
an EGR temperature control circuit connected to the WHR circuit in parallel with the feed pump and configured to receive a second portion of the volume of the working fluid from the WHR circuit downstream of the FCCP and to return the second portion of the volume of the working fluid to the WHR circuit upstream of the FCCP;
a thermal control unit (TCU) positioned along the EGR temperature control circuit to cool the EGR gas;
an expansion valve positioned along the EGR temperature control circuit upstream of the TCU;
a compressor positioned along the EGR temperature control circuit downstream of the TCU; and
a superheater fluidly coupled to the pump in series with the pump;
a boiler fluidly coupled to the pump in series with the superheater upstream of the superheater; and
a control module operatively coupled to each of the EGR system and the WHR system, the control module configured to receive a temperature measurement signal from a temperature sensor positioned along the EGR system downstream of the TCU, and to control operation of the WHR system so as to controllably adjust a temperature of the EGR gas;
wherein the superheater and the boiler are included in the each of the WHR circuit and the EGR temperature control circuit such that each of the first portion and the second portion of the volume of the working fluid flow through the superheater and the boiler in heat exchanging relationship with the superheater and the boiler, respectively while being fluidly isolated from each other.

9. The internal combustion engine of claim 8, wherein the control module is further configured to adjust a flow rate of the EGR gas through the TCU by adjusting a position of an EGR valve positioned along an EGR circuit of the EGR system upstream of the TCU so as to controllably adjust the temperature of the EGR gas.

10. The internal combustion engine of claim 8, wherein the control module is further configured to adjust a flow rate of the working fluid through the TCU by adjusting a speed of the compressor so as to controllably adjust the temperature of the EGR gas.

11. The internal combustion engine of claim 8, wherein the control module is further configured to adjust a pressure of the working fluid in the TCU by adjusting a speed of the compressor so as to controllably adjust the temperature of the EGR gas.

12. The internal combustion engine of claim 11, wherein, when a position of the expansion valve is fixed,
    increasing the speed of the compressor operates to decrease the pressure of the working fluid in the TCU, thereby decreasing a phase change temperature of the working fluid and increasing cooling of the EGR gas, and
    decreasing the speed of the compressor operates to increase the pressure of the working fluid in the TCU, thereby increasing a phase change temperature of the working fluid and decreasing cooling of the EGR gas.

13. The internal combustion engine of claim 8, wherein the control module is further configured to adjust a pressure of the working fluid in the TCU by adjusting a position of the expansion valve so as to controllably adjust the temperature of the EGR gas.

14. The internal combustion engine of claim 13, wherein, when a speed of the compressor is fixed,
    adjusting the position of the expansion valve to decrease a flow rate of the working fluid through the expansion valve operates to increase the pressure of the working fluid in the TCU, thereby increasing a phase change temperature of the working fluid and decreasing cooling of the EGR gas, and
    adjusting the position of the expansion valve to increase a flow rate of the working fluid through the expansion valve operates to decrease the pressure of the working fluid in the TCU, thereby decreasing a phase change temperature of the working fluid and increasing cooling of the EGR gas.

15. The internal combustion engine of claim 8, wherein the control module is configured to adjust a pressure of the working fluid in the TCU by adjusting each of a speed of the compressor and a position of the expansion valve so as to controllably adjust the temperature of the EGR gas.

16. The internal combustion engine of claim 8, wherein the control module is configured to:
    receive a $NO_x$ measurement signal from a $NO_x$ sensor positioned along an exhaust system operably coupled to the internal combustion engine; and
    adjust the temperature of the EGR gas based on the received $NO_x$ measurement signal.

17. The internal combustion engine of claim 16, wherein the control system is configured to increase the flow of the working fluid through the TCU if the $NO_x$ measurement signal indicates an increase in the $NO_x$ level.

18. The internal combustion engine of claim 8, wherein the control system is configured to, in response to a signal received from a temperature and pressure sensor positioned along the WHR circuit indicating that a sub-cooling of the working fluid in the liquid phase needs to be modified, adjust at least one of a sub-cooling of the FCCP or a speed of the pump.

* * * * *